United States Patent
Toyokawa et al.

(10) Patent No.: US 6,943,471 B2
(45) Date of Patent: Sep. 13, 2005

(54) MOTOR AND BLOWER FAN USING SAME

(75) Inventors: Shokichi Toyokawa, Usa (JP);
Toshifumi Tsutsumi, Nakatsu (JP);
Katsuaki Abe, Nakatsu (JP); Yukio Oishi, Usa (JP); Hitoshi Shirakura, Usa (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/873,334

(22) Filed: Jun. 22, 2004

(65) Prior Publication Data

US 2004/0256933 A1 Dec. 23, 2004

(30) Foreign Application Priority Data

Jun. 23, 2003 (JP) ........................................ 2003-177980

(51) Int. Cl.[7] ................................................ H02K 5/16
(52) U.S. Cl. ......................... 310/90; 310/89; 310/67 R
(58) Field of Search ........................... 310/67 R, 89–91, 310/49 R, 194, 254, 261

(56) References Cited

U.S. PATENT DOCUMENTS

| 6,707,199 B2 | * | 3/2004 | Chang et al. | 310/90 |
| 6,815,854 B2 | * | 11/2004 | Kull | 310/90 |
| 2003/0222522 A1 | * | 12/2003 | Chang et al. | 310/90 |

FOREIGN PATENT DOCUMENTS

JP   8-98447 A   4/1996

* cited by examiner

Primary Examiner—Thanh Lam
(74) Attorney, Agent, or Firm—Rossi, Kimms & McDowell, LLP

(57) ABSTRACT

This motor comprises a core, a drive coil wound on the core, a housing, and a stator having an insulator for insulating the drive coil formed one-piece with the housing. Further, the motor comprises a stator casing for encasing the stator, and a rotor disposed outside the stator. Inside the housing is disposed a bearing for supporting the rotary shaft of the rotor, and an oil retainer disposed so as to partially come in contact with the bearing is stored in a storing section provided in either one of the housing and the stator casing.

17 Claims, 5 Drawing Sheets

MOTOR AND BLOWER FAN USING SAME

FIELD OF THE INVENTION

The present invention relates to a fan motor (hereinafter called motor) used for air circulation in a refrigerator and for cooling of other equipment and the like. Particularly, it relates to a motor which has a simple structure and assures moisture resistance, electric insulation and long life, and a blower fan using the motor.

BACKGROUND OF THE INVENTION

Generally, this type of motor has a brushless DC motor configuration, many of which are configured in that a stator is molded by resin material in order to assure excellent electric insulation. Also, the bearing employed is a slide bearing for simplifying the structure, and lubricating oil is supplied to the bearing for prolonging the life.

FIG. 5 is a sectional view of a conventional fan motor, and FIG. 6 is a sectional view of another conventional motor.

In the motor shown in FIG. 5, nearly cylindrical housings 51 made of aluminum metal are arranged at upper and lower positions. Each of both housings 51 accommodates a slide bearing 52. These two bearings 52 rotatably support rotary shaft 53. Inside the upper and lower end portions of both housings 51 are respectively stored oil retainers 54 for supplying lubricating oil to these bearings 52. Outside the housing 51 are installed core 55 and drive coil 56, and these are molded by resin material to form casing member 57. Stator 58 is configured in this way.

Cover 59 is attached by press-fitting or the like to both ends of the housing 51. Also, oil barrier 60 corresponding to the bearing 52 on the fan load side is attached to the rotary shaft 53. Cup-like rotor 62 is coupled with the rotary shaft 53. The rotor 62 has magnet 61 opposing to the core 55 of stator 58.

In FIG. 5, an electric circuit is formed on printed wiring board 63. Motor casing 64 is disposed outside the rotor 62. Fan blade 65 is fitted to the rotary shaft 53.

The conventional motor shown in FIG. 5 is small-sized and configured so as to assure excellent corrosion resistance, moisture resistance, and electric insulation, which is also able to prolong the life with the oil supplied from the oil retainer 54. However, the number of parts used is increased because of using two bearings 52 and two oil retainers 54, and also, the structure is complicated causing the cost to be increased.

Also, FIG. 6 is a sectional view of another conventional motor that is disclosed in Japanese Laid-open Patent H8-98447.

The rotor of this motor is an epicyclic rotor which rotates outside the stator, and the stator has a single slide bearing in the housing, and at the fan load side of the housing is disposed a stop member and a housing lid. The motor is less in the number of parts used as compared with the conventional motor shown in FIG. 5.

That is, as shown in FIG. 6, in stator 66, a single slide bearing 68 is arranged in the housing 67 which is formed from resin having a generally cylindrical shape. Rotary shaft 79 is rotatably supported by the bearing 68. At the fan load side of the housing 67 is arranged the stop member 69 of the rotary shaft 79. Upper end projection 70 of the stop member 69 is fitted in groove 71 of the rotary shaft 79. Outside the housing 67 are disposed the core 72 and drive coil 73 which are held by insulator 74 fitted by ultrasonic welding to the housing 67. And, a part of the insulator 74 serves as housing lid 75. The rotor 76 is an epicyclic rotor which rotates outside the stator 66. Magnet 77 is fitted to the rotor 76, which is opposed to the core 72. The circuit board 78 serves to detect the pole position of the magnet 77 of the rotor and to properly feed power to the drive coil 73.

In the motor shown in FIG. 6, since a single slide bearing 68 is employed, the motor structure is relatively simple, less in the number of parts used, and easy of positioning of the parts, and also, the assembling work can be easily performed.

However, since a casing member using resin material is not employed for this motor, when it is used under high humidity environment such as in a refrigerator, there arises a problem such as generation of rust or poor electric insulation. Also, when the lubricating oil of the bearing 68 is used up, the oil cannot be replenished, and the life cannot be prolonged, and moreover, maintenance cannot be executed by removing the rotary shaft 79 and rotor 76.

Then, as to the stator of the motor configured as shown in FIG. 6, for suppressing the generation of rust and improving the electric insulation, it is possible to form the casing member just by molding resin material but, in that case, there arise the following problems.

For example, there is a possibility that the ultrasonic welding portions are not strong enough to endure stresses applied thereto during molding. Further, there is a possibility of oil leakage because of no oil retainer for the lubricating oil, and there is a problem that the leaked oil becomes liable to be absorbed by the casing member being a molded resin material, and therefore, it is unable to prolong the life. Also, since the rotary shaft and rotor cannot be easily removed, there arises such problem that the oil cannot be externally supplied.

Accordingly, it is not preferable to use a motor having such structure as a mold type motor.

SUMMARY OF THE INVENTION

The motor of the present invention has the following configuration.

The motor of the present invention includes:

(a) a stator, comprising (a-1) a core, (a-2) a drive coil wound on the core, (a-3) a housing having an opening and a bottom, and (a-4) an insulator for insulating the drive coil and the core, which is positioned at the outer periphery of the housing, covering a part of the core and being formed one-piece with the housing;

(b) a stator casing for encasing the stator;

(c) a rotor disposed outside the stator, comprising (c-1) a rotary shaft, (c-2) a rotary member fitted to the rotary shaft, and (c-3) a magnet which is installed on the inner wall of the rotary member and opposed to the core;

(d) a bearing which is disposed inside the housing and serves to support the rotary shaft; and (e) an oil retainer, which is stored in a storing section provided at the housing, being arranged so as to partially come in contact with the bearing.

In this configuration, the bearing and the oil retainer are used by only one each, and since the housing is provided with a storing section for storing the oil retainer, it is not needed to be installed separately. As a result, it is possible to simplify the structure as the number of parts used is decreased and to prolong the motor life because the lubricating oil is supplied by the oil retainer.

Also, the present invention includes a motor and a blower fan equipped with a fan which is attached to the motor. Since a motor of the present invention is employed as the motor, it is possible to provide a blower fan which is small-sized and excellent in corrosion resistance, moisture resistance, and electric insulation, and may assure a long life since the oil is replenished from the oil retainer.

DETAILED DESCRIPTION OF PREFERRED EMBODIMENT

The preferred embodiment of the present invention is as follows.

The motor of the present invention includes:

(a) a stator, comprising a core, a drive coil wound on the core, a housing having an opening and a bottom, and an insulator for insulating the drive coil and the core, which is positioned at the outer periphery of the housing, covering a part of the core and being formed one-piece with the housing;

(b) a stator casing for encasing the stator;

(c) a rotor disposed outside the stator, comprising a rotary shaft, a rotary member fitted to the rotary shaft, and a magnet which is installed on the inner wall of the rotary member and opposed to the core;

(d) a bearing which is disposed inside the housing and serves to support the rotary shaft; and (e) an oil retainer, which is stored in a storing section provided at the housing, being arranged so as to partially come in contact with the bearing.

Next, more specific examples of the above preferred embodiment of the present invention will be described with reference to the drawings.

Figure 1:
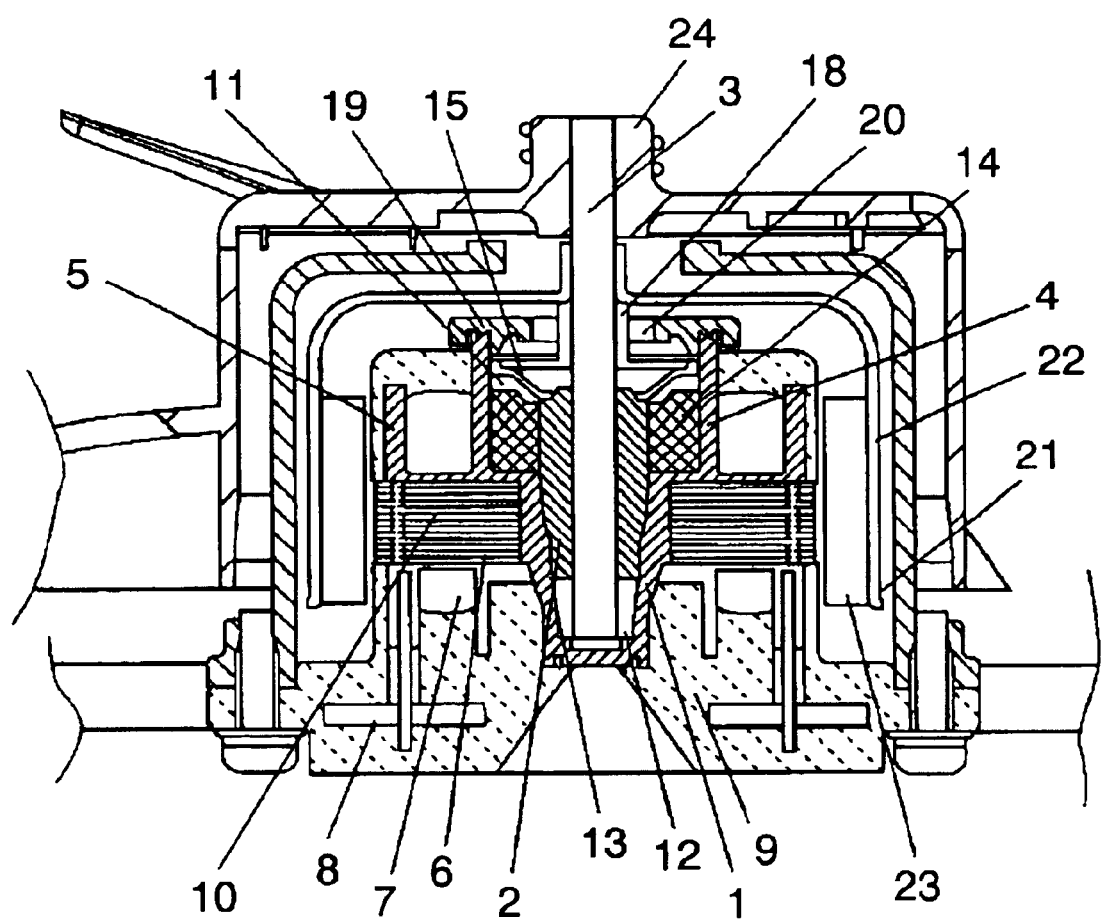
FIG. 1 is a sectional view of a fan motor in the preferred embodiment of the present invention.
Figure 2A:
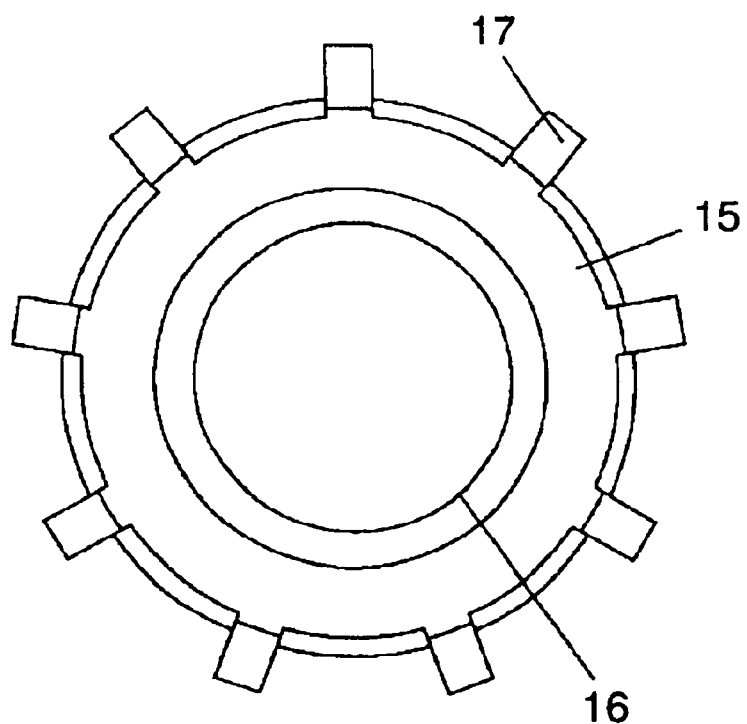
FIG. 2A is a plan view of a bearing holding member in the fan motor of FIG. 1.
Figure 2B:
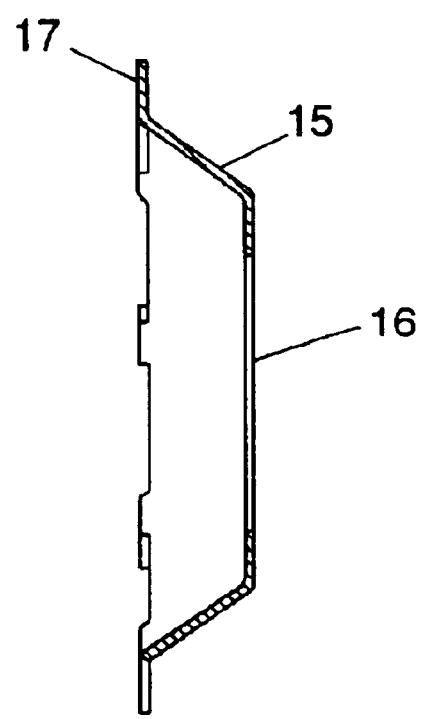
FIG. 2B is a sectional view of a bearing holding member in the fan motor of FIG. 1.

FIG. 1 is a sectional view of a fan motor in the preferred embodiment of the present invention. FIG. 2A is a plan view of a bearing holding member in the fan motor of FIG. 1. FIG. 2B is a sectional view thereof.

In FIG. 1, the motor in the preferred embodiment of the present invention includes a stator 10, stator casing 9 for encasing the stator 10, rotor 21 disposed outside the stator 10, bearing 2 for supporting the rotary shaft 3 of rotor 21, which is disposed inside the housing 1 at the stator 10, and oil retainer 14 for retaining the lubricating oil, which is stored in storing section 11 provided at the housing 1 and disposed so as to partially come in contact with the bearing 2.

The stator 10 comprises a core 6, drive coil 7 wound on the core 6, housing 1 having an opening and a bottom, and an insulator 5 for insulating the drive coil 7 and core 6, which is positioned at the outer periphery of the housing 1, covering a part of the core 6 and being formed one-piece with the housing 1.

The rotor 21 comprises a rotary shaft 3, rotary member 22 fitted to the rotary shaft 3, and magnet 23 fitted to the inner wall of the rotary member 22 and opposed to the core 6.

The housing 1 is generally cylindrical and is formed from thermoplastic resin such as polybutylene terephthalate and polyethylene terephthalate. Inside the housing 1 is disposed bearing 2 that is a slide bearing impregnated with lubricating oil.

The insulator 5 is positioned at the outer periphery of the housing 1 and is formed from thermoplastic resin such as polybutylene terephthalate and polyethylene terephthalate.

The housing 1 and insulator 5 are integrally formed from same thermoplastic resin.

The stator casing 9 encases the insulator 5, the core 6 and drive coil 7 which are held by the housing 1 and insulator 5, and printed wiring board 8 electrically connected to the drive coil 7. The stator casing 9 is formed from thermosetting resin such as unsaturated polyester.

The housing 1 is increased in inner diameter of the peripheral wall at the end thereof, thereby having storing section 11 for storing the oil retainer 14 which retains the lubricating oil. There is provided oil reservoir 12 at the inner bottom of the housing 1. And, the inner surface of the oil reservoir 12 is formed with inner slope 13 so as to gradually increase in inner diameter toward bearing 2 from the inner bottom.

In the storing section 11 of the housing 1 is stored oil retainer 14 impregnated with lubricating oil in such manner as to come in contact with the bearing 2. In this way, lubricating oil feeder 4 is formed. Also, inside the storing section 11 is stored holding member 15 for holding the bearing 2. The holding member 15 is formed by metal plate or resin molding. The holding member 15 is formed like a dish, as shown in FIG. 2A and FIG. 2B, having hole 16 through which the rotary shaft 3 is inserted at the center and with the hole edge formed so as to come in contact with the upper end of the bearing 2, and a plurality of projected pieces 17 at the outside.

At the rotary shaft 3, as shown in FIG. 1, oil barrier 18 is fitted in a portion inside the storing section 11. Also, cover cap 19 for covering the oil retainer 14 is fastened to the end of the storing section 11 at the housing 1 by a joining method such as ultrasonic welding, press-fitting, adhering, and screwing. The cover cap 19 is formed with punched hole 20 having a diameter larger than the outer diameter of the oil barrier 18. The end portion of the storing section 11 with the cover cap 19 attached thereto is protruded from the upper end of the stator casing 9.

The rotor 21 comprises a cup-shaped rotary member 22 disposed outside the stator 10 and with the rotary shaft 3 connected thereto, and a magnet 23 which is installed on the inner wall of the rotary member 22 and disposed so as to oppose to the core 6 of the stator 10. And, a fan is fitted to the rotary shaft 3. In FIG. 1, boss 24 of the fan fitted to the rotary shaft 3 is shown, but the fan blade portion is omitted.

The motor shown in FIG. 1 generates rotational magnetic field at the stator 10 by applying driving current to the drive coil 7 of the stator 10 via the printed wiring board 8. Due to the relationship between the rotational magnetic field and the magnetic pole of magnet 23 of the rotor 21, a rotating force is generated at the rotary member 22 to rotate the rotor 21.

With rotation of the rotor, the fan connected to the rotary shaft 3 is rotated to execute the desired air blowing.

During rotation of the rotor 21, the rotary shaft 3 smoothly rotates since the bearing 2 is impregnated with lubricating oil. When the lubricating oil of the bearing 2 is consumed with the lapse of time, the lubricating oil is replenished from the oil retainer 14 being in contact with the bearing 2. In this way, the bearing 2 is always impregnated with lubricating oil, and the rotary shaft 3 may normally rotate at all times. Thus, in the motor of the preferred embodiment of the present invention, since the storing section 11 for storing the lubricating oil retainer is disposed in a part of the housing 1, the bearing 2 and the oil retainer 14 are used by only one each, lessening the number of parts and simplifying the structure, and the lubricating oil is replenished from the oil retainer 14 during the operation, and thereby, it is possible to prolong the motor life.

Also, the bearing 2 is fixed by the holding member 15 and its position is stabilized. Further, since the storing section 11 internally has the oil retainer 14 which comes in tight contact with a part of the outer periphery of the bearing 2, the lubricating oil contained in the oil retainer 14 is effectively replenished to the bearing 2. Also, for joining the cover cap 19, the end portion of the storing section 11 is protruded from the upper end of stator casing 9, and therefore, the cover cap 19 can be easily installed by a joining method such as ultrasonic welding, press-fitting, adhering, and screwing, thereby assuring excellent assembling workability.

Also, the housing 1 has oil reservoir 12 at the inner bottom thereof, and inner slope 13 so as to gradually increase in inner diameter in the direction of bearing 2 from the inner bottom. Accordingly, when the motor is in such state that the rotary shaft 3 is horizontal, the lubricating oil in the oil reservoir 12 may effectively return to the bearing 2 because of the inner slope 13 at the housing 1.

Further, since the housing 1 and insulator 5 made of resin are integrally formed and the storing section 11 is disposed in a part of the housing 1, the number of parts used can be greatly reduced and the manufacturing method can be simplified and it becomes possible to reduce the cost. Also, since the outer casing 9 of the stator 10 is formed from thermosetting resin, it is improved in corrosion resistance, moisture resistance, and electric insulation, and possible to sufficiently assure reliability under high humidity condition as in a refrigerator or the like.

The preferred embodiments of the present invention are as follows.

The motor of the present invention includes:

(a) a stator, comprising a core, a drive coil wound on the core, a housing having an opening and a bottom, and an insulator for insulating the drive coil and the core, which is positioned at the outer periphery of the housing, covering a part of the core and being formed one-piece with the housing;

(b) a stator casing for encasing the stator;

(c) a rotor disposed outside the stator, comprising a rotary shaft, a rotary member fitted to the rotary shaft, and a magnet which is installed on the inner wall of the rotary member and opposed to the core;

(d) a bearing which is disposed inside the housing and serves to support the rotary shaft; and (e) an oil retainer, which is stored in a storing section provided at the stator casing, being arranged so as to partially come in contact with the bearing.

Next, more specific examples of the above preferred embodiment of the present invention will be described with reference to the drawings.

Figure 3:
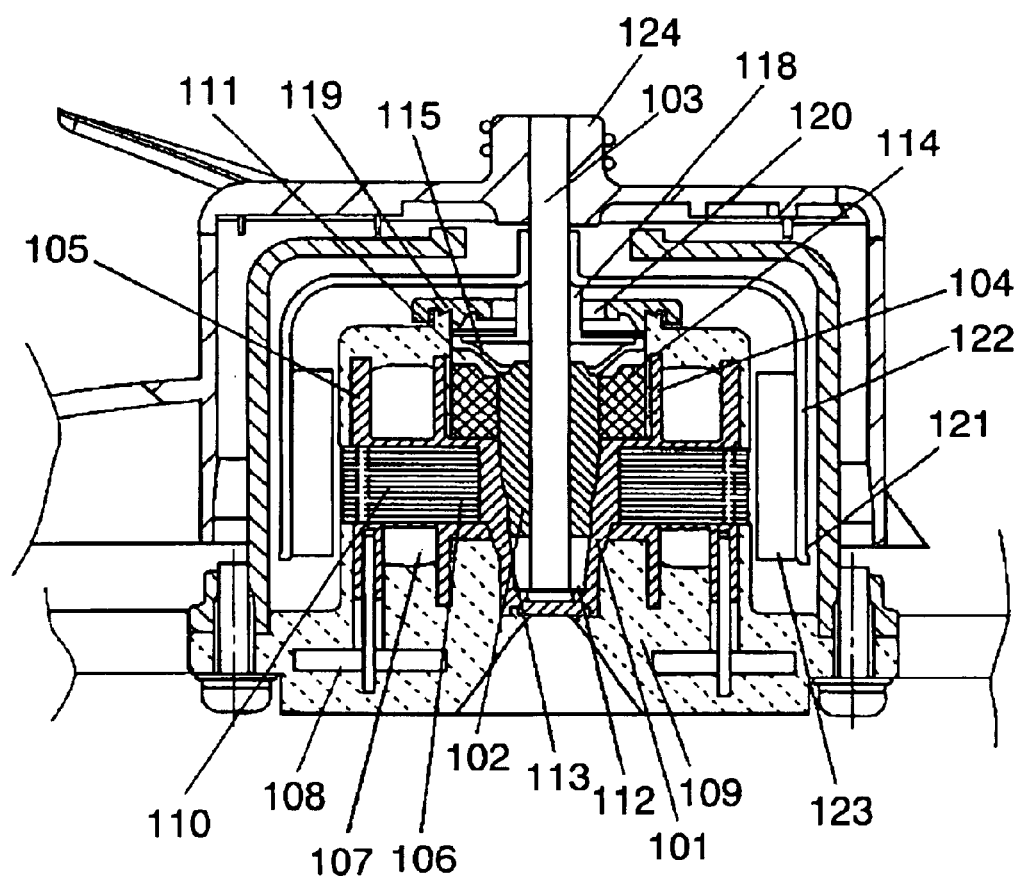
FIG. 3 is a sectional view of a fan motor in another preferred embodiment of the present invention.

FIG. 3 is a sectional view of a motor in another preferred embodiment of the present invention.

In FIG. 3, the motor includes a stator 110, stator casing 109 for encasing the stator 110, rotor 121 disposed outside the stator 110, bearing 102 for supporting the rotary shaft 103 of rotor 121, which is disposed inside the housing 101 at the stator 110, and oil retainer 114 for retaining the lubricating oil, which is stored in storing section 111 provided at the stator casing 109 and disposed so as to partially come in contact with the bearing 102.

The stator 110 comprises a core 106, drive coil 107 wound on the core 106, housing 101 having an opening and a bottom, and an insulator 105 for insulating the drive coil 107 and core 106, which is positioned at the outer periphery of the housing 101, covering a part of the core 106 and being formed one-piece with the housing 101.

The rotor 121 comprises a rotary shaft 103, rotary member 122 fitted to the rotary shaft 103, and magnet 123 fitted to the inner wall of the rotary member 122 and opposed to the core 106.

The housing 101 is generally cylindrical and is formed from thermoplastic resin such as polybutylene terephthalate and polyethylene terephthalate. Inside the housing 101 is disposed bearing 102 that is a slide bearing impregnated with lubricating oil.

The insulator 105 is positioned at the outer periphery of the housing 101 and is formed from thermoplastic resin such as polybutylene terephthalate and polyethylene terephthalate.

The housing 101 and insulator 105 are integrally formed from same thermoplastic resin.

The stator casing 109 encases the insulator 105, the core 106 and drive coil 107 which are held by the housing 101 and insulator 105, and printed wiring board 108 electrically connected to the drive coil 107. The stator casing 109 is formed from thermosetting resin such as unsaturated polyester.

The stator casing 109 is increased in inner diameter of the peripheral wall at the end thereof, thereby having storing section 111 for storing the oil retainer 114 which retains the lubricating oil.

Also, the insulator 105 is provided with oil reservoir 112 at the inner bottom thereof. And, the inner surface of the oil reservoir 112 is formed with inner slope 113 so that the inner diameter gradually increases in the direction of bearing 102 from the inner bottom.

In the storing section 111 of the housing 109 is stored oil retainer 114 impregnated with lubricating oil in such manner as to come in contact with the bearing 102. In this way, lubricating oil feeder 104 is formed. Also, inside the storing section 111 is stored holding member 115 for holding the bearing 102. The holding member 115 is formed by metal plate or resin molding, and formed like a dish as shown in FIG. 2A and FIG. 2B, having hole 16 through which the rotary shaft 103 is inserted at the center and with the hole edge formed so as to contact the upper end of the bearing 102, and a plurality of projected pieces 17 at the outside. At the rotary shaft 103, oil barrier 118 is fitted in a portion inside the storing section 111.

Cover cap 119 for covering the oil retainer 114 is fastened to the end of the storing section 111 at the stator casing 109 by a joining method such as ultrasonic welding, press-fitting, adhering, and screwing. The cover cap 119 is formed with punched hole 120 having a diameter larger than the outer diameter of the oil barrier 118. The end portion of the storing section 111 of the stator casing 109 to which the cover cap 119 is fitted is partially protruded from the upper end of the stator casing 109 to make it easier to join the cover cap 119.

The rotor 121 comprises a cup-shaped rotary member 122 which is disposed outside the stator 110 and with the rotary shaft 103 connected thereto, and a magnet 123 which is installed on the inner wall of the rotary member 122 and disposed so as to oppose to the core 106 of the stator 110. And, a fan is fitted to the rotary shaft 103. In FIG. 3, boss 124 of the fan fitted to the rotary shaft 103 is shown, but the fan blade portion is omitted.

The motor shown in FIG. 3 generates rotational magnetic field at the stator 110 by applying driving current to the drive coil 107 of the stator 110 via the printed wiring board 108. Due to the relationship between the rotational magnetic field and the magnetic pole of magnet 123 of the rotor 121, a rotating force is generated at the rotary member 122 to rotate the rotor 121. With rotation of the rotor, the fan connected to the rotary shaft 103 is rotated to execute the desired air blowing.

During rotation of the rotor 121, the rotary shaft 103 smoothly rotates since the bearing 102 is impregnated with lubricating oil. When the lubricating oil of the bearing 102 is consumed with the lapse of time, the lubricating oil is replenished by the oil retainer 114 being in contact with the bearing 102. In this way, the bearing 102 is always impregnated with lubricating oil, and the rotary shaft 103 may normally rotate at all times. Thus, in the motor of the preferred embodiment of the present invention, since the storing section 111 for storing the lubricating oil retainer is disposed at the stator casing 109, the bearing 102 and the oil retainer 114 are used by only one each, lessening the number of parts used, and also, because the lubricating oil is replenished by the oil retainer 114 during operation, it is possible to simplify the structure and to prolong the life.

Also, the bearing 102 is fixed by the holding member 115 and its position is stabilized. Further, since the storing section 111 internally has the oil retainer 114 which comes in tight contact with a part of the outer periphery of the bearing 102, the lubricating oil contained in the oil retainer 114 is effectively replenished to the bearing 102. Also, for joining the cover cap 119, the end portion of the storing section 111 at the stator casing 109 is externally protruded. The cover cap 119 can be easily installed by a joining method such as ultrasonic welding, press-fitting, adhering, and screwing, thereby assuring excellent assembling workability.

Also, the housing 101 has oil reservoir 112 at the inner bottom thereof, and inner slope 113 so as to gradually increase in inner diameter in the direction of bearing 102 from the inner bottom. Accordingly, when the motor is in such state that the rotary shaft 103 is horizontal, the lubricating oil in the oil reservoir 112 may effectively return to the bearing 102 due to the inner slope 113 at the housing 101.

Further, since the housing 101 and insulator 105 made of resin are integrally formed, and also, the storing section 111 is disposed in a part of the stator casing 109, the number of parts used can be greatly reduced and the manufacturing method can be simplified and it becomes possible to reduce the cost. Also, since the outer casing 109 is formed from thermosetting resin, it is improved in corrosion resistance, moisture resistance, and electric insulation, and it is possible to sufficiently assure reliability under high humidity condition as in a refrigerator or the like.

In the above two preferred embodiments, the housing and the insulator are formed from thermoplastic resin, and the stator casing is formed from thermosetting resin, but the stator casing is also preferable to be formed from thermoplastic resin. In this case, the same as in the above preferred embodiment, the housing, insulator and stator casing are excellent in moisture resistance and electric insulation, having an effect to prevent oil leakage without absorbing lubricating oil.

Figure 4:
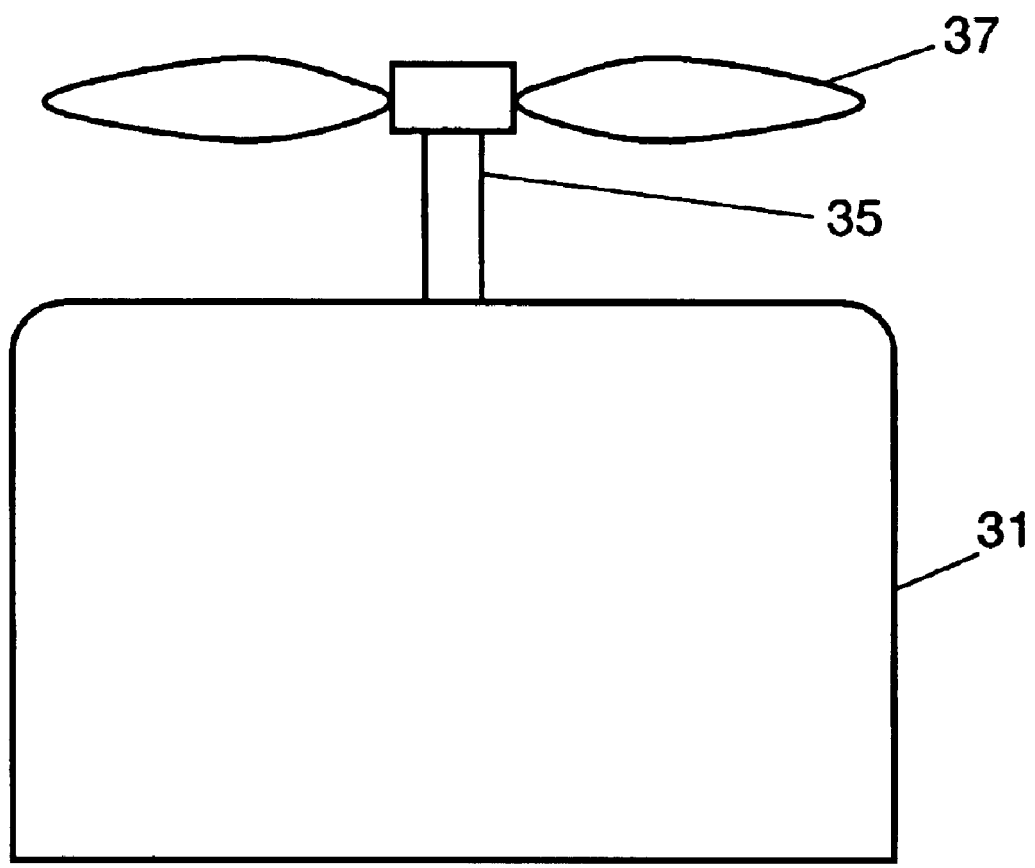
FIG. 4 is a schematic diagram in the preferred embodiment of the present invention.
Figure 5:
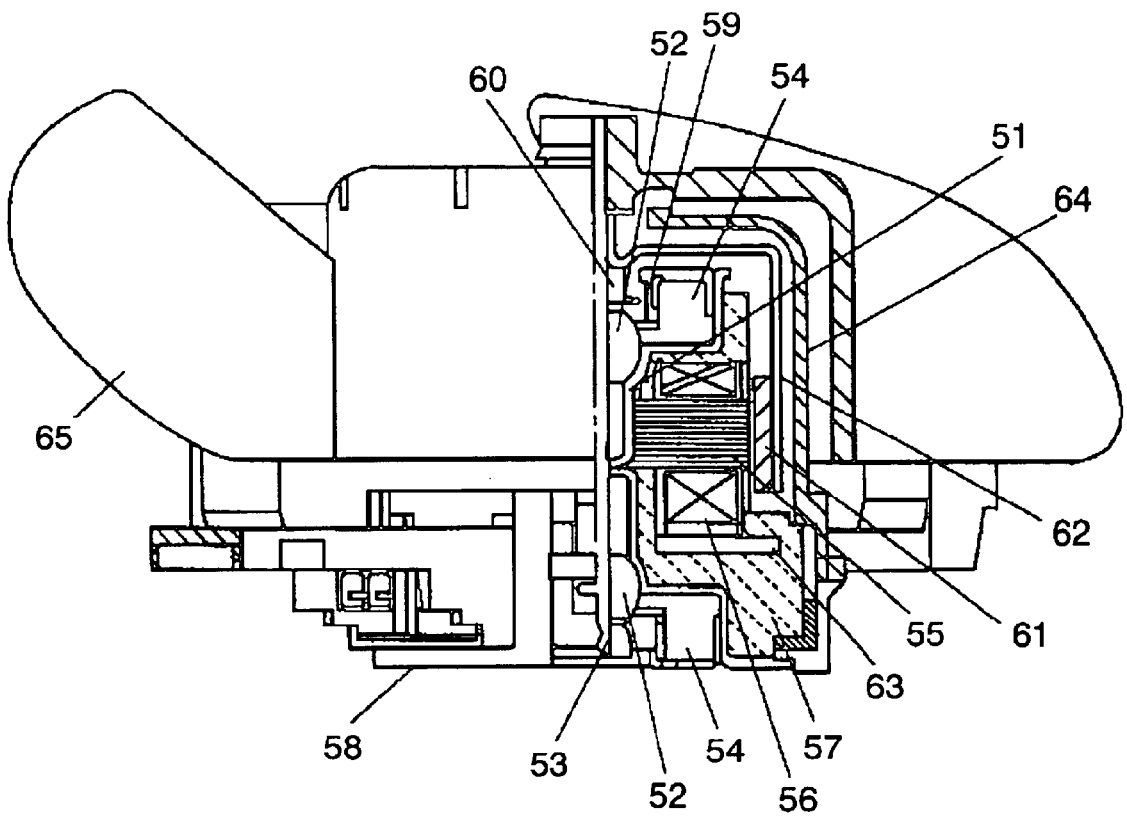
FIG. 5 is a sectional view of a conventional fan motor.
Figure 6:
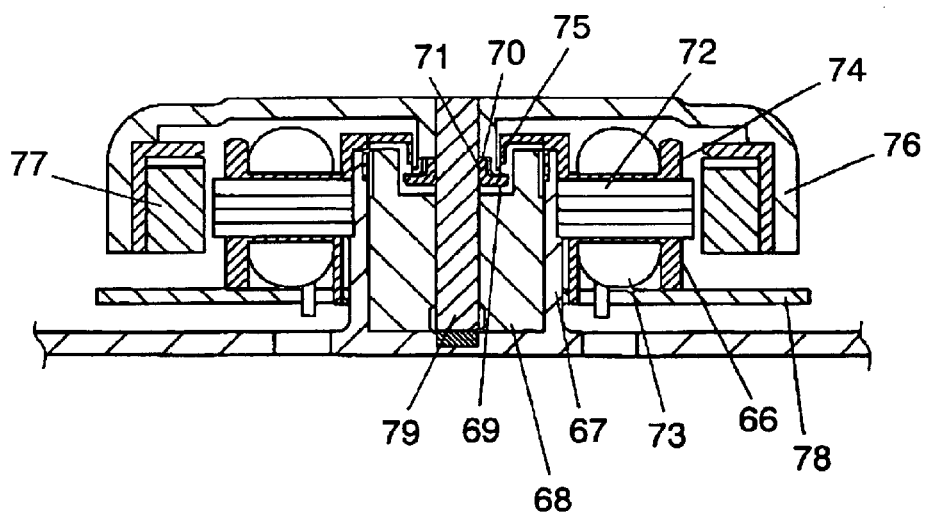
FIG. 6 is a sectional view of another conventional motor.

Next, a blower fan in the preferred embodiment of the present invention will be described. FIG. 4 is a schematic diagram of a blower fan in the preferred embodiment of the present invention. Fan 37 is attached to the rotary shaft 35 of motor 31. With rotation of the motor 31, the fan 37 is rotated to execute the desired air blowing.

Here, as the motor 31, it is preferable to apply the motor of the preferred embodiment of the present invention. Thus, the motor comprises a stator of resin mold type which is provided with an oil retainer of lubricating oil for the bearing, but the number of parts used is few and the structure is simple. The blower fan in the present preferred embodiment is usable under high humidity condition and able to suppress the generation of rust, having excellent moisture resistance and electric insulation, which is less in oil leakage from the bearing and assures a long life.

As is obvious from the above description, in the motor and the blower fan using the motor of the present invention, the bearing and lubricating oil retainer are used by only one each, reducing the number of parts used and simplifying the structure. Also, the structure is simplified because the oil retainer storing section is disposed at either one of the housing and the stator casing. Also, the bearing position is stabilized by the holding member, and further, since the oil retainer storing section internally has an oil retainer coming in tight contact with a part of the outer periphery of the bearing, the lubricating oil contained in the oil retainer is effectively replenished to the bearing in order to assure a long life.

In the description of the above preferred embodiment of the present invention, a fan motor used for air circulation in a refrigerator or cooling of other equipment has been described. However, beside a fan motor, the motor of the present invention can be mounted for example in information equipment, acoustic video equipment and the like, and it is possible to widely apply the motor to a brushless DC motor or the like which serves various functions.

What is claimed is:

1. A motor, including:
   (a) a stator, comprising
   (a-1) a core,
   (a-2) a drive coil wound on the core,
   (a-3) a housing having an opening and a bottom, and
   (a-4) an insulator for insulating the drive coil and the core, which is positioned at the outer periphery of the housing, covering a part of the core and being formed one-piece with the housing;
   (b) a stator casing for encasing the stator;
   (c) a rotor disposed outside the stator, comprising
   (c-1) a rotary shaft,
   (c-2) a rotary member fitted to the rotary shaft, and
   (c-3) a magnet which is installed on the inner wall of the rotary member and opposed to the core;

(d) a bearing which is disposed inside the housing and serves to support the rotary shaft; and (e) an oil retainer, which is stored in a storing section provided at the housing, being arranged so as to partially come in contact with the bearing.

2. The motor of claim 1, further including a cover cap, wherein the cover cap is attached to an end portion of the storing section whose peripheral wall is a cylindrical portion of the housing.

3. The motor of claim 2, wherein, at the housing, the end portion for joining the cover cap is protruded outside the stator casing.

4. The motor of claim 1, wherein the housing is provided with an oil reservoir at the bottom, and its inner surface is sloped so as to gradually increase in inner diameter toward the bearing from the bottom.

5. The motor of claim 1, wherein the housing and the insulator are formed from thermoplastic resin, and the stator casing is formed from thermosetting resin.

6. The motor of claim 1, wherein the housing, the insulator, and the stator casing are formed from thermoplastic resin.

7. The motor of claim 1, wherein a holding member for holding the bearing is further disposed inside the storing section.

8. The motor of claim 1, wherein the motor is a fan motor with a fan fitted to the rotary shaft.

9. A motor, including:

(a) a stator, comprising (a-1) a core, (a-2) a drive coil wound on the core, (a-3) a housing having an opening and a bottom, and (a-4) an insulator for insulating the drive coil and the core, which is positioned at the outer periphery of the housing, covering a part of the core and being formed one-piece with the housing;

(b) a stator casing for encasing the stator;

(c) a rotor disposed outside the stator, comprising (c-1) a rotary shaft, (c-2) a rotary member fitted to the rotary shaft, and (c-3) a magnet which is installed on the inner wall of the rotary member and opposed to the core;

(d) a bearing which is disposed inside the housing and serves to support the rotary shaft; and (e) an oil retainer, which is stored in a storing section provided at the stator casing, being arranged so as to partially come in contact with the bearing.

10. The motor of claim 9, further including a cover cap, wherein the cover cap is attached to an end portion of the storing section whose peripheral wall is a cylindrical portion of the stator casing.

11. The motor of claim 10, wherein, at the stator casing, the end portion for joining the cover cap is protruded outside.

12. The motor of claim 9, wherein the housing is provided with an oil reservoir at the bottom, and its inner surface is sloped so as to gradually increase in inner diameter toward the bearing from the bottom.

13. The motor of claim 9, wherein the housing and the insulator are formed from thermoplastic resin, and the stator casing is formed from thermosetting resin.

14. The motor of claim 9, wherein the housing, the insulator, and the stator casing are formed from thermoplastic resin.

15. The motor of claim 9, wherein a holding member for holding the bearing is further disposed inside the storing section.

16. The motor of claim 9, wherein the motor is a fan motor with a fan fitted to the rotary shaft.

17. A blower fan, comprising a motor and a fan attached to the motor, wherein the motor, including (a) a stator, comprising (a-1) a core, (a-2) a drive coil wound on the core, (a-3) a housing having an opening and a bottom, and (a-4) an insulator for insulating the drive coil and the core, which is positioned at the outer periphery of the housing, covering a part of the core and being formed one-piece with the housing;

(b) a stator casing for encasing the stator;

(c) a rotor disposed outside the stator, comprising (c-1) a rotary shaft, (c-2) a rotary member fitted to the rotary shaft, and (c-3) a magnet which is installed on the inner wall of the rotary member and opposed to the core;

(d) a bearing which is disposed inside the housing and serves to support the rotary shaft; and (e) an oil retainer, which is stored in a storing section provided at either one of the housing and the stator casing, being arranged so as to partially come in contact with the bearing.

\* \* \* \* \*